UNITED STATES PATENT OFFICE.

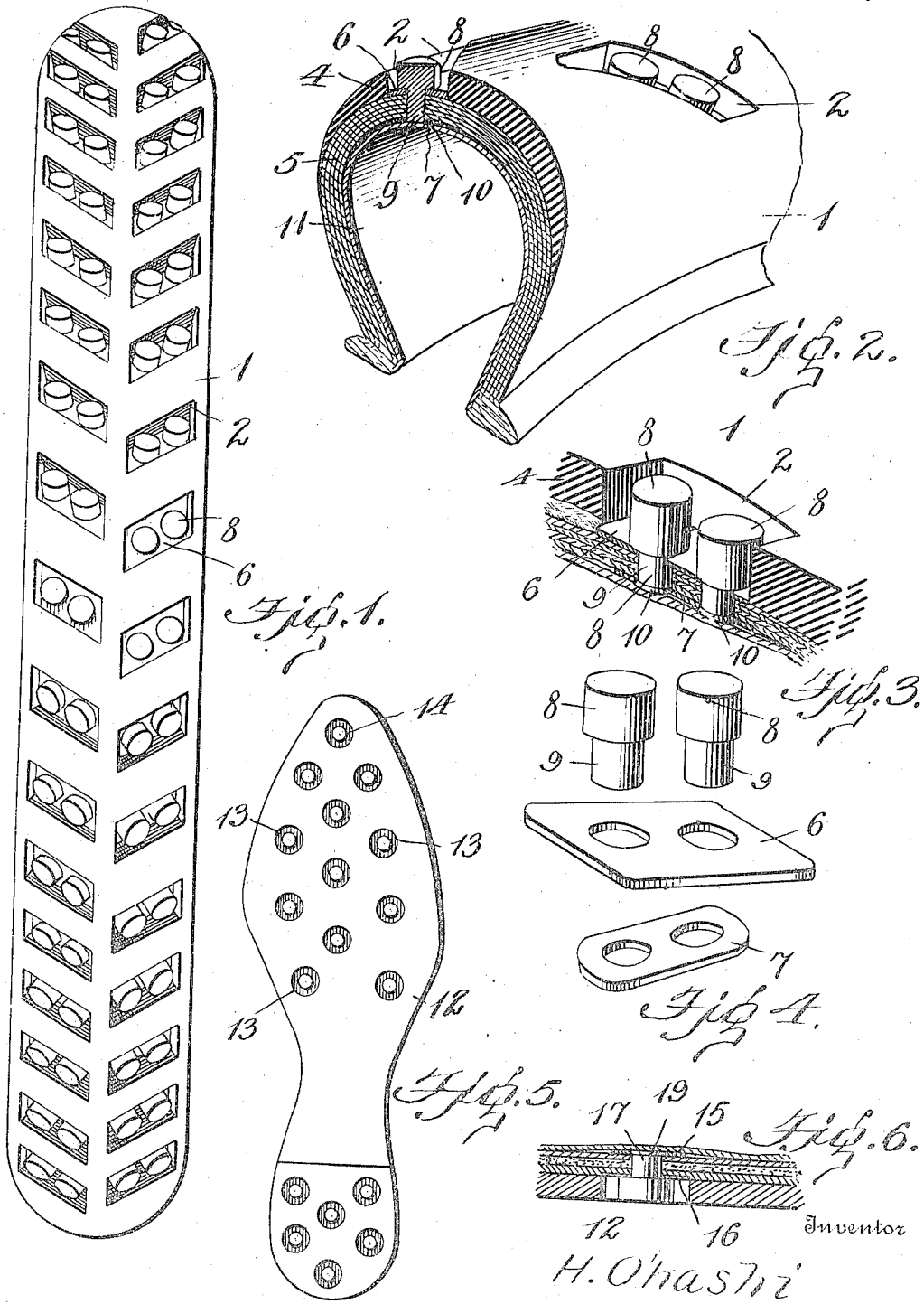

HYDESABURO OHASHI, OF NEW YORK, N. Y.

AUTOMOBILE-TIRE.

1,260,791.

Specification of Letters Patent. Patented Mar. 26, 1918.

Application filed October 17, 1916. Serial No. 126,175.

*To all whom it may concern:*

Be it known that I, HYDESABURO OHASHI, a subject of the Emperor of Japan, residing at New York, in the county of New York and State of New York, have invented new and useful Improvements in Automobile-Tires, of which the following is a specification.

This invention relates to anti-slipping or anti-skidding devices generally.

The invention is used in connection with vehicle tires, athletic shoes, and the like in which metallic surfaces are combined with elastic or other non-metallic surfaces, such as the tread of a tire structure whereby to increase or augment the traction action of the tire against the surface of the roadway. I am aware of the existence of metallic surfaces which are separable from the tire and also metallic and composition bodies which are constructed as a part of the tire and designed for the purpose above mentioned. In that class of tires in which the metallic or composition bodies are made as a part of the tire, objection has been taken to the manner of securing the same to the materials of the tire, certain inadequateness in the association of the parts resulting in a material injury such as disintegration to the fibers of the tire structure. These devices which are molded directly in the elastic surface or tread of the tire have a strong tendency to creep around the tire, resulting in bruising the tire along radial lines and rendering the same delicate to the action of the air pressure within the shoe.

In that class of anti-skidding devices which are separable or detachable from the tire, laborious operations are necessary in effecting their final application at the time of emergency and in practice it has been found that while not only detracting from the appearance of the wheel, they become contributary to the transmission of harsh and objectionable noises with incidental injury to the mud shield of the vehicle incident to centrifugal action as the wheel revolves.

In the invention about to be specifically described, I provide an anti-skidding or anti-slipping device which will lend to the graceful design and beauty of the tire, one which will render the same suitable for use during any season of the year; one in which traction efficiency is set up on the tread surface of the tire; one which will be simple, strong and durable and peculiarly associated with the different plies of material constituting the tire whereby it is held from accidental dislocation or circumferential creeping.

As a principal object in view I provide a plurality of radial studs of relatively hard or non-yielding material whose qualities are equal to the qualities of rubber or any like composition of matter to resist wear and friction whereby the studs which are projected into recesses of the elastic material of the tire, will always come flush with the tread of the tire to enable the studs and the tread to be simultaneously subjected to the same wear and impingement against the roadway. I prefer to mount these studs in recesses so that the outer ends of the studs will be effective in the formation of a substantial relatively rigid metallic traction surface, while the remaining portions of the studs are, to an appreciable extent, protected against torsion and radial strains by the surrounding walls of the mentioned recesses.

With the above and other objects in view which will appear as the nature of the invention is better understood, the same consists in the improved construction and novel arrangement of parts which will hereinafter be fully described and particularly pointed out in the claims.

In the accompanying drawing, have been illustrated certain forms of the invention, it being however, understood that no limitations are necessarily made to the precise structural details therein exhibited, but that changes, alterations and modifications within the scope of the claims may be resorted to when desired.

In the drawings:—

Figure 1 is an edge view of a conventional form of tire illustrating the application of the invention thereto.

Fig. 2 is a sectional perspective view thereof.

Fig. 3 is a sectional perspective view of a portion of the tire on a slightly enlarged scale.

Fig. 4 is a perspective view of the device showing the several constituents thereof separated for the purpose of clear illustration.

Fig. 5 is a bottom plan view of a shoe constructed in accordance with the invention.

Fig. 6 is a section through a portion of the shoe.

In carrying the invention into practice and on reference to Figs. 1 to 4 inclusive, I provide a tire 1, of substantially standard formation, except for the peculiar manner of forming recesses 2, in the elastic material of said tire. I do not wish to limit myself to the manner of selecting an arrangement of recesses and the illustration furnished in Fig. 1, is to be considered merely conventional. In this arrangement, I provide two annular sets of recesses 2, which are disposed on opposite sides of the central line of the tire with the recesses of one set extending at an opposite angle to the recesses of the next adjacent set.

Each recess extends into the tread of the elastic material 4, of the tire and it opens at its inner end onto the textile material 5, of said tire. In the recess at the base thereof is a strip of thin material 6, preferably metal. This strip comes in contact with the fabric 5, exteriorly of the tire structure, while arranged interiorly of said structure and against the fabric, is a second strip of thin material 7, preferably metal. In this manner, the fabric becomes sandwiched between said strips for a purpose to be hereinafter described.

Studs or pins 8—8, extend through each recess and to a point flush with the tread surface of the elastic material of the tire. They are provided with stems 9, which extend through the fabric and through both plates 6 and 7, and are upset at 10 against the innermost plate. This method provides a strong connection of the studs with the tire whereby they cannot casually separate from the tire under trying strains.

The pins or studs are formed of some hard substance, preferably metal, which will have the same quality of resisting wear and friction as that possessed by the rubber material 4, of the tire. The studs are spaced relatively from each other and also from the walls of the recess in which they are mounted. They extend through the full depth of the recess in order that their effective traction surfaces will come flush with the tread surface of the tire. In this manner, the studs are exposed at the tread of the tire in order that they will take firm and effective purchase against slippery and muddy roadways and positively prevent the machine from slipping or skidding. Through the fact that the said studs have wearing qualities which are approximately the same as the qualities possessed by the rubber tread of the tire, they will be uniformly worn down as the tread is worn so as to be always effective for their intended purpose and never forced to protrude to points beyond the recesses of the tire where they would mar the road-bed. It is also found that by mounting the studs in a recess in the tire, the angularity of the walls of the recess serves to increase the traction of the tire against the roadway and considerable strain, both torsional and lateral, is relieved from the studs.

In order that the inner tube of the tire will be protected against injury through contact with the studs, an inner lining of suitable tough material 11, is made up as a part of the tire and arranged to cover the inner ends of the studs as clearly shown.

The invention is by no means limited to use in connection with tires as is evident upon reference to Figs. 6 and 7, wherein an athletic shoe 12, is shown. The sole or wear surface of the shoe is provided with recesses 13, in which studs 14 are disposed. One stud is preferably provided for each recess and it is associated with plates 15 and 16, which are similar to the plates 6 and 7, elsewhere set forth. The reduced ends or stems 17, of these studs are passed through the sole and up-set at 19 against the innermost plate. The heel of the shoe is correspondingly constructed. A shoe designed in this manner is admirably adapted for use in playing such games as "golf," "tennis," "baseball," and the like in that a firm footing of the player against the surface of the ground can be obtained which enables him to satisfactorily carry into practical effect many different movements of the body without danger of slipping.

What is claimed as new is:—

1. A non-skidding device for tires comprising a tread surface of rubber having a recess extending through it, a layer of fabric underlying the rubber, a metal plate within the recess and lying upon the fabric, a second metal plate beneath the fabric, and a metal stud whose body is mounted in said recess remote from its walls and whose inner portion has a reduced stem passing through both plates and the interposed fabric and upset on the inside of the inner plate.

2. In a non-skidding device, superposed layers of material, the outermost having a recess extending therethrough, a metal plate fitting snugly within said recess upon the outer face of the underlying layer, a second metal plate engaging the inner face of the innermost layer, a metal stud within and spaced from the walls of said recess and having its outer end flush with the outer surface of the outermost layer and having a reduced stem extending through said layers and said plates, and means on said stem engaging the second named metal plate for holding said stud against displacement.

3. A non skidding device comprising superposed layers of material, the outer layer having a recess extending entirely therethrough, a metal plate fitting snugly within said recess upon the outer face of the inner layer, a second metal plate upon the inner face of the inner layer and a metal stud within and spaced equally from the walls of said recess and having its outer end flush with the outer surface of the outer layer and having a reduced stem extending through said layers and both of said plates and having its inner end upset upon said second plate.

In testimony whereof I affix my signature.

HYDESABURO OHASHI.